United States Patent
Stessen

(10) Patent No.: US 6,781,636 B2
(45) Date of Patent: Aug. 24, 2004

(54) VIDEO-APPARATUS WITH HISTOGRAM MODIFICATION MEANS

(75) Inventor: Jeroen Hubert Christoffel Jacobus Stessen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 448 days.

(21) Appl. No.: 09/803,337

(22) Filed: Mar. 9, 2001

(65) Prior Publication Data

US 2001/0052945 A1 Dec. 20, 2001

(30) Foreign Application Priority Data

Mar. 13, 2000 (EP) .............................................. 00200889

(51) Int. Cl.[7] .............................................. H04N 5/208
(52) U.S. Cl. ...................... 348/672; 348/678; 348/687; 382/169
(58) Field of Search ................................ 348/672, 674, 348/678, 687, 573, 675, 676; 358/519, 522, 523; 382/168

(56) References Cited

U.S. PATENT DOCUMENTS

| | | | | |
|---|---|---|---|---|
| 4,353,092 A | * | 10/1982 | Bailey et al. ................ | 348/672 |
| 4,450,482 A | | 5/1984 | Ackermann .................. | 358/160 |
| 4,831,434 A | | 5/1989 | Fuchsberger ................. | 358/80 |
| 4,931,864 A | * | 6/1990 | Kawamura et al. .......... | 358/519 |
| 5,063,607 A | * | 11/1991 | FitzHenry et al. ........... | 382/274 |
| 5,068,718 A | | 11/1991 | Iwabe et al. .................. | 358/27 |
| 5,140,649 A | * | 8/1992 | Kageyama ................... | 382/167 |
| 5,241,386 A | * | 8/1993 | Tsuji et al. ................... | 348/607 |
| 5,315,389 A | * | 5/1994 | Izawa et al. ................. | 348/672 |
| 5,388,168 A | | 2/1995 | Sakashita et al. ............. | 382/54 |
| 5,394,194 A | * | 2/1995 | Izawa et al. ................. | 348/672 |
| 5,544,258 A | * | 8/1996 | Levien ........................ | 382/169 |
| 5,619,270 A | * | 4/1997 | Demmer ..................... | 348/441 |
| 5,808,697 A | * | 9/1998 | Fujimura et al. ............ | 348/672 |
| 5,959,696 A | * | 9/1999 | Hwang ........................ | 348/678 |
| 6,148,103 A | * | 11/2000 | Nenonen ..................... | 382/169 |
| 6,163,621 A | * | 12/2000 | Paik et al. ................... | 382/169 |
| 6,373,533 B1 | * | 4/2002 | Kawabata et al. ........... | 348/672 |
| 6,449,390 B1 | * | 9/2002 | Inoue ......................... | 382/168 |
| 6,463,173 B1 | * | 10/2002 | Tretter ........................ | 382/168 |

FOREIGN PATENT DOCUMENTS

EP     0551189 A2    7/1993    ............ H04N/9/68

* cited by examiner

Primary Examiner—Michael H. Lee
Assistant Examiner—Paulos Natnael
(74) Attorney, Agent, or Firm—Edward W. Goodman

(57) ABSTRACT

A video apparatus includes a histogram modification means circuit for matching at least luminance signals (Y) for separate pixels to prescribed values. The histogram modification circuit has a first memory (3) with a first look-up table for correcting the video luminance signals (Y), and a second memory (4) with a second look-up table (4) for correcting the color-difference signals (U and V). The values within the second look-up table (4) are derived from the values in the first look-up table (3). Preferably, in order to obtain a distribution of a rounding-off error over a pixel's neighbor, each of the channels for the luminance (Y) and color-difference signals (U and V) includes a closed lsb (least significant bit) correction loop (14, 14') with a quantizer (15, 15') and a pixel memory (16, 16'), the input of the lsb correction loop being formed by the corrected luminance and corrected color-difference signals, respectively.

5 Claims, 5 Drawing Sheets

VIDEO-APPARATUS WITH HISTOGRAM MODIFICATION MEANS

BACKGROUND OF THE INVENTION

1. Field of the Invention

The present invention relates to a video apparatus comprising histogram modification means for matching at least luminance signals (Y) for separate pixels to prescribed values, the histogram modification means comprising a (first) memory with a (first) look-up table (LUT) for correcting the video luminance signals (Y).

2. Description of the Related Art

Video-image information may be composed of three components: primary color signals $E'_G$, $E'_B$, $E'_R$ or signals derived therefrom, particularly, a luminance signal $E'_Y$ and color-difference signals $E'_{B-Y}$ and $E'_{R-Y}$. The primary color signals $E'_G$, $E'_B$, $E'_R$ are the gamma-corrected signals corresponding to green, blue and red information, respectively. A gamma correction is a compensation for CRT non-linearity by introducing a compensating non-linearity in the system. The luminance signal $E'_Y$ and the color-difference signals $E'_{B-Y}$ and $E'_{R-Y}$ are derived from the primary color signals and are, as in PAL systems, indicated by $E'_Y$, $E'_U$ and $E'_V$, or, for the sake of simplicity, by Y, U and V.

U.S. Pat. No. 4,450,482 describes a video apparatus with histogram modification means. The histogram modification therein is only realized for luminance signals Y. The histogram modification means performs contrast enhancement, and implies a non-linear transfer function to be applied to video signals in order to get a more even distribution of black, gray and white levels. In this known histogram modification, first the distribution function of the brightness levels of a representative set of pixels, i.e., a histogram, is measured. As already noted, the histogram may show an uneven distribution of dark, medium or bright pixels. A correction function is calculated that, when applied to the video signals, yields a more evenly distributed histogram, but not necessarily a flat histogram. The correction may be called a 0-dimensional correction because each new pixel value is only a non-linear function of the old pixel at the same spatial and temporal position. The non-linear correction function can be quite complicated, so it will usually involve a memory with a look-up table (LUT). By means of the look-up table, a luminance signal $Y_i$ of a pixel will be corrected to a value $Y_o$.

SUMMARY OF THE INVENTION

It is, inter alia, an object of the invention to provide an improved histogram modification.

In practice, it appeared to be desirable to apply histogram modification correction in each of the three video information channels for the luminance and color-difference signals. Therefore, according to one embodiment of the invention, the video apparatus as described in the opening paragraph is characterized in that the histogram modification means comprises a second memory with a second look-up table, the values within said second look-up table being derived from the values in the first look-up table and being applied to correct the color-difference signals (U and V).

As the sample rate of the luminance signals (Y) is usually twice the sample rate of the color-difference signals (U and V), a sample rate converter is provided to adapt the sample rate of the luminance signals (Y) to that of the color-difference signals (U and V), the output signals of said sample rate converter being supplied to the second memory.

The first look-up table contains corrected luminance values in accordance with a predetermined correction function. To obtain corrected color-difference signals, the second look-up table contains gain-values, derivable from said predetermined correction function, e.g., being formed by values of the first derivative of the correction function, while the apparatus further comprises a multiplier in which the color-difference signals (U and V) are corrected by multiplication with the respective gain-values.

As, in practice, color-difference signal zero-values are represented by a certain digital number and such signals with zero-value must not be corrected, each of the color-difference signals is decreased by an offset value before multiplication and increased by said offset value after multiplication.

In a preferred embodiment, error-propagation is applied. This means that in order to obtain a distribution of a rounding-off error over a pixel's neighbor, each of the channels for the luminance (Y) and color-difference signals (U and V) comprises a closed lsb (least significant bit) correction loop with a quantizer and a pixel memory, the input of the lsb correction loop being formed by the corrected luminance and corrected color-difference signals, respectively.

From the above-mentioned U.S. Pat. No. 4,450,482, histogram modification is known. Apart from this document, many histogram algorithms have been developed. Most of them are rather complicated because, for each brightness level in the histogram, a corrected value is calculated. According to the invention, a histogram modification unit is provided by means whereby, from a measured histogram, a correction function is calculated on the basis of only three levels, particularly black, gray and white brightness levels in the measured histogram with only three control operators, in particularly, offset, gain and gamma, according to the relation:

$$V_o = [(V_i + \text{offset})^* \text{gain}]^{Gamma}.$$

All corrected values are obtained from this relation.

These and other aspects of the invention will be apparent from and elucidated with reference to the embodiments described hereinafter.

DESCRIPTION OF THE PREFERRED EMBODIMENTS

Figure 1:
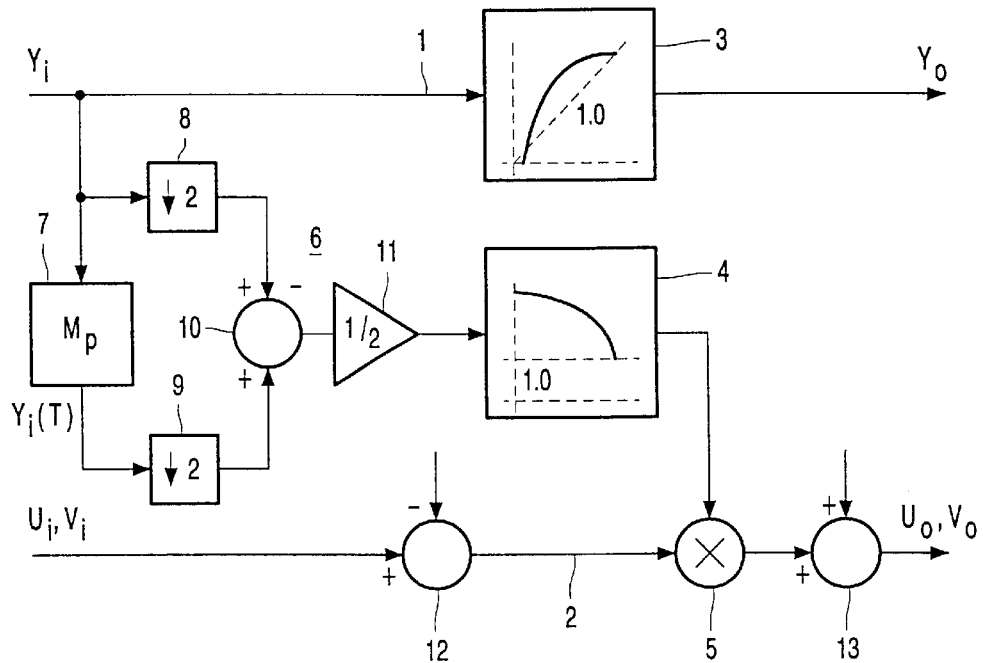
FIG. 1 shows a basis block diagram of a correction unit for luminance and color-difference signals.

FIG. 1 shows a luminance signal channel 1 and one color-difference signal channel 2. As both color-difference channels for U- and V-signals are the same, only one of these channels is shown. Nevertheless, one channel may be sufficient if the U- and V-signals are transported on a multiplex basis.

In order to correct the input luminance signal $Y_i$, a memory 3 with a look-up table (LUT) is provided, this look-up table containing luminance output signals $Y_o$ which are related to the luminance input signals $Y_i$ in accordance with a prescribed non-linear correction function, i.e., $Y_o = f(Y_i)$. Hence, the content of the LUT 3 is based on a histogram of the input luminance signal $Y_i$. Since the color-difference signals $U_i$ and $V_i$ must be corrected with a corresponding value of the variable gain factor $Y_o/Y_i$, a second memory 4 is provided with a look-up table (LUT) containing values corresponding substantially with the gain of the above function. By means of a multiplier 5, the input signals $U_i$ and $V_i$ are multiplied by the respective values from the look-up table in the second memory 4.

Since the sample rate of the luminance input signals $Y_i$ is twice the sample rate of the color-difference signals $U_i$ and $V_i$, a sample rate converter 6 is provided, comprising a pixel memory (MP) 7, a down-sample unit 8 for the signals $Y_i$, a down-sample unit 9 for the one-pixel-delayed signals $Y_i(T)$, an adder unit 10 and a factor-2 divider 11. The divider 11 delivers a signal to the memory 4 which corresponds with a video signal valid for two successive pixels, in which the separate pixel values are averaged. Based on this signal, the memory 4 supplies a correction signal corresponding substantially with a respective value of $Y_o/Y_i$, stored in the look-up table of memory 4.

In the following it will be assumed that each of the U and V signals is represented by a 8-bits number, the maximum value being 255, corresponding with a color-difference value "+1". A monochrome U or V signal, i.e., a color-difference "0" is then defined by 128. Monochrome U and V signals are not corrected. Therefore, a subtractor element 12 is introduced to diminish the U and V signals with an offset color-difference value 128 and thus to bring a monochrome signal to a color-difference value "0", while, after correction in the multiplier 5, an adder element 13 increases the U and V signals by an offset color-difference value 128 so that a monochrome signal can be given again the color-difference value "0".

In the present example, the output of the memory 4 is represented by a 8-bits unsigned gain, i.e., the correction factor $Y_o/Y_i$, and the output of the multiplier 13 is represented by a 16-bits U or V value, with 7 bits behind the "binary" point. These bits must be "discarded" before fully outputting the video signals $U_o$ and $V_o$. This is realized by error propagation, meaning a distribution of a rounding-off error each time over a pixel's neighbor. As the output signal of memory 3 is a 15-bits luminance signal value and an 8-bits luminance output signal $Y_o$ must be obtained, this value also has 7 bits behind the "binary" point, which must be "discarded".

Figure 2:
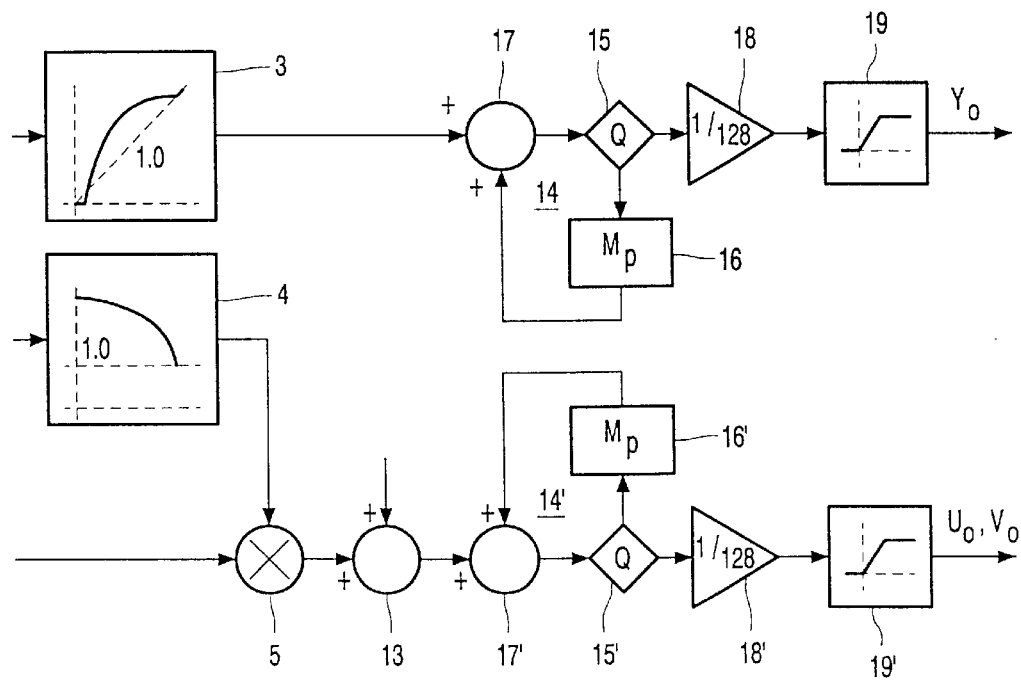
FIG. 2 shows part of this correction unit extended with error-propagation means.

Therefore, in the embodiment of FIG. 2, each of the channels for the luminance (Y) and color-difference signals (U and V) comprises a closed lsb (least significant bit) correction loop 14, 14', respectively, with a quantizer 15, 15' and a pixel memory 16, 16', the input of the lsb correction loop 14, 14' being formed by the corrected luminance and corrected color-difference signals, respectively. By adding, every time, the 7 lsb's, representing a quantization error, of a foregoing pixel value to the Y, U and V value, respectively, in an adder element 17, 17', a recycling of the 7 lsb's in a pixel delay is obtained, which guarantees that the average video level will be correct down to the last lsb's, in spite of the quantization back to 8 bits by means of the 128-divider 18, 18'. Because the non-linear transfer functions in the look-up tables require a longer word length to be able to make a sufficient precise quantization in the Y-channel and a sufficient variation in the differential gain in the U and V channels, the information in the added lsb's is not just discarded, but instead, distributed over the horizontal neighbors to maintain the average accuracy. Such a distribution means "noise shaping". Mainly due to this noise shaping, the luminance and color difference signals may overflow the value +255. To prevent such adverse effects, the 8- and 9-bit output signal of the dividers 18, 18' are applied to clippers 19, 19'.

Figure 4A:
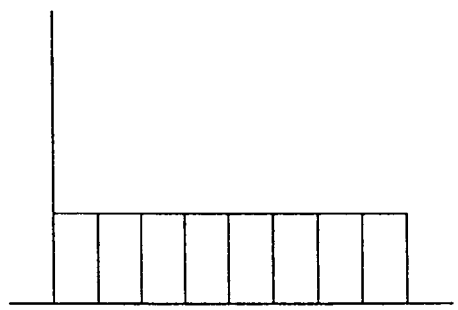
FIGS. 4–6 are diagrams explaining the algorithm for histogram modification.
Figure 4B:
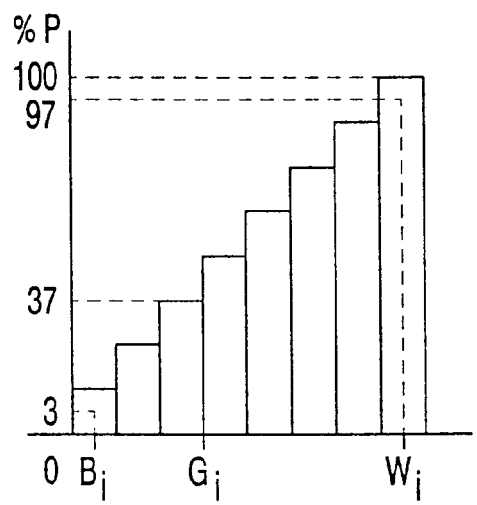
Figure 4C:
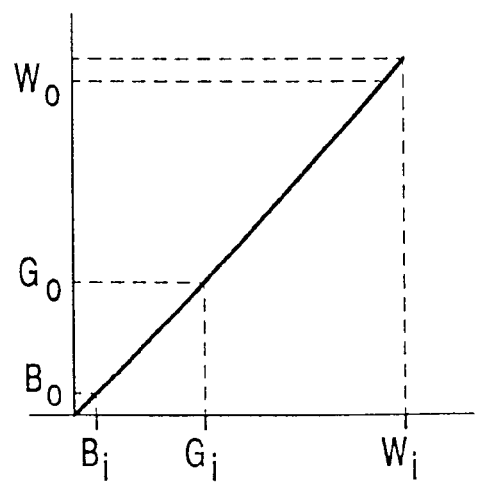
Figure 5A:
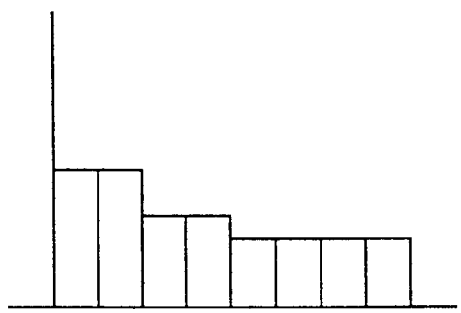
Figure 5B:
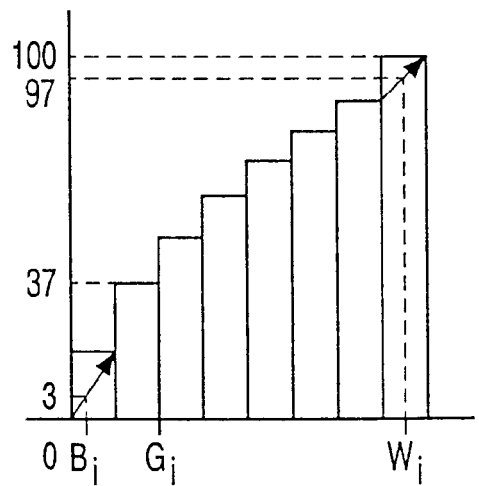
Figure 5C:
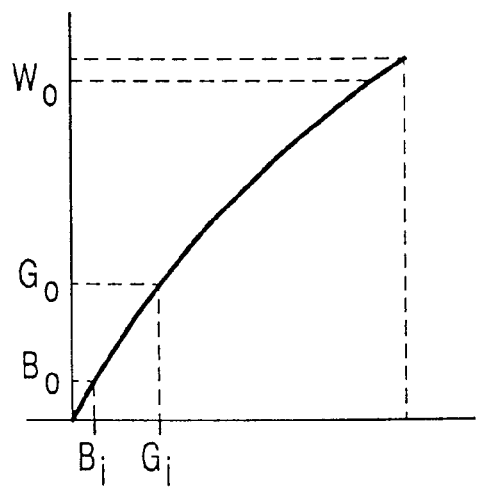
Figure 6A:
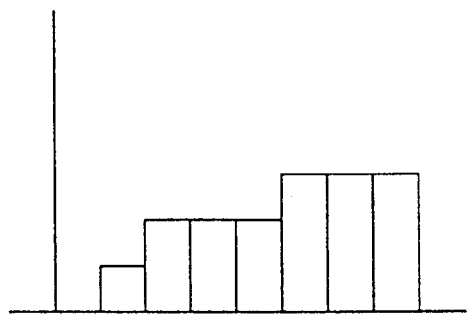
Figure 6B:
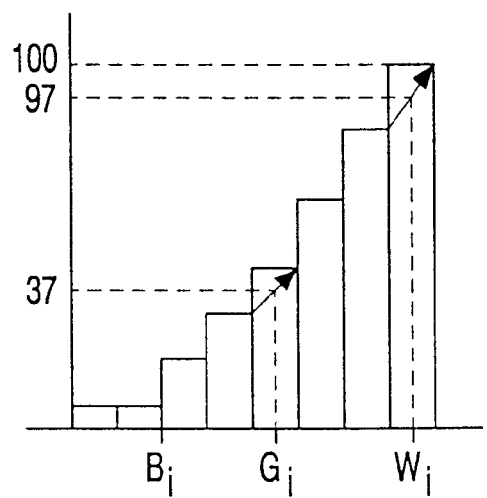
Figure 6C:
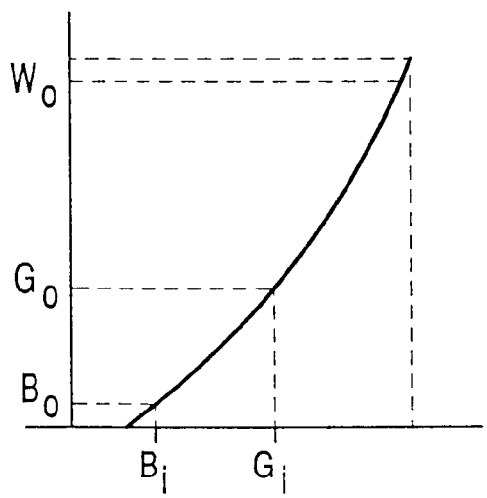

As already indicated, the content of memories 3 and 4 may be refreshed each frame period. This is called histogram modification. Histogram modification performs contrast enhancement, meaning that the various brightness levels between black and white are distributed better over the entire brightness level scale. As it is well known to determine a histogram, the algorithm will not be further described. In FIGS. 4A, 5A and 6A, a number of simplified histograms are shown for 8 brightness levels. FIG. 4A shows a flat histogram with equally distributed brightness. FIG. 5A shows a histogram of a dark scene with more dark pixels. FIG. 6A shows a histogram of a bright scene with a set-up, i.e., a positive offset, for black and with more bright pixels. FIGS. 4B, 5B and 6B show the corresponding cumulative histograms, calculated from the histograms of FIGS. 4A, 5A and 6A. Using linear interpolation, the levels for 'black', 'gray' and 'white' are estimated where the cumulative histograms cross the 3%, 37% and 97%. Before the gray level is estimated, first any large black or white areas are excluded from the histogram. Gray is then estimated from the reduced cumulative histogram. This avoids problems due to large black or white side panels, which would otherwise distort the picture statistics. After estimation of the black, gray and white levels, temporal non-linear low-pass filtering is applied to smooth the variations in the histogram modification, as blinking pictures are not desired. The non-linear character of the filter process results in a faster reaction to picture black level that goes down (more black) or a white level that goes up (more white) and a slower reaction to less extreme values (a more gray-black value and a more gray-white value) and, as a consequence thereof, in a more natural reaction on scene changes. Next, the filtered black, gray and white levels are turned into a new look-up table. In this algorithm, three control parameters, i.e., offset, gain and gamma, are calculated from the filtered black, gray and white levels, these three control parameters determining the Y-transfer function in memory 3. FIGS. 4C, 5C and 6C show the transfer functions $Y_o=f(Y_i)$ for the respective histograms.

Figure 3A:
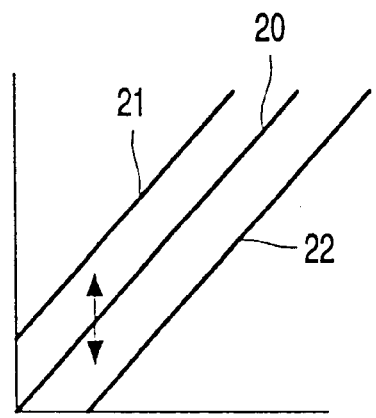
FIG. 3 illustrates the control operators for histogram modification according the invention.
Figure 3B:
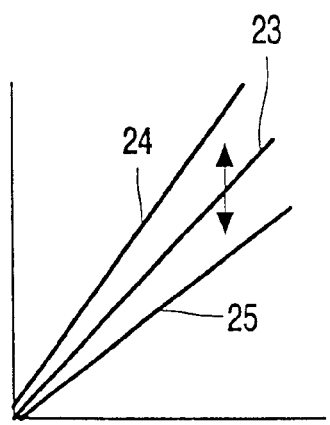
Figure 3C:
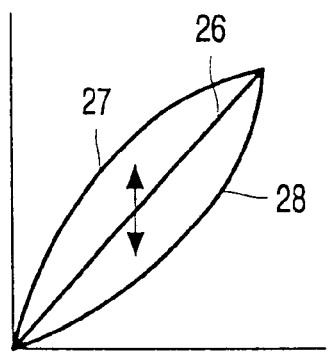

The control parameters offset, gain and gamma are illustrated in FIGS. 3A, 3B and 3C. In all these figures, the output brightness is given in dependency on the input brightness levels. In FIG. 3A, the line 20 shows an offset '0'. The lines 21 and 22 show offset lines '>0' and '<0', respectively. These lines show the variation of the brightness for black. The offset parameter is used to 'put black on black'. In FIG. 3B, the line 23 shows a gain '1', while the lines 24 and 25 show lines with gain '>1' and '<1', respectively. These lines show the variation of the contrast for white. The gain parameter is used to 'put white on white'. In FIG. 3C, the line 26 shows a G (Gamma) '1', while the curves 27 and 28 show a G '<1' and '>1', respectively. The G-parameter is used to move the gray independently from black and white. If a scene contains mostly dark areas, then it is advantageous to increase the differential gain near black. This can be done by decreasing the G of the video path. If a scene contains mostly bright areas, then it is advantageous to increase the differential gain near white. This can be done by increasing the G of the video path.

The three parameters can be combined to the following transfer function:

$$V_o = [(V_i + \text{offset}) * \text{gain}]^{Gamma}.$$

This function assumes signals in a range of 0.0, . . . , +1.0. By means of only three input values, i.e., the filtered black, gray and white levels, three control parameters are calculated, i.e., offset, gamma and gain, which determine the Y-transfer function in accordance with the above mathematical relation. This relation is a good approximation, however, in the neighborhood of the point $(V_i, V_o)=(0, 0)$, it is necessary to choose a straight line with a limited slope. As substantially the same absolute gain as in the Y-channel is used in the U- and V-channels, the content of the look-up table in the memory 3 determines the content of the second look-up table in the memory 4.

It will be clear that the invention is not restricted to the preferred embodiment shown in the drawing. Many alternatives for performing the functions of the various algorithms may be possible. Particularly, the above mathematical relation can be replaced by other relations, i.e., with the application of three filtered black, gray and white brightness level values, three control parameters are required. The choice of these parameters is quite arbitrary. However, the restriction to three brightness level values and the specific choice of the control parameters offset, gamma and gain lead, in practice, to a sufficiently accurate embodiment. These parameters are safe to manipulate with, they will not likely lead to unexpected artifacts, like highly visible aliasing or contouring and similar effects.

The embodiments described above are realized by an algorithm, at least part of which may be in the form of a computer program capable of running on signal processing means in a video-apparatus. In so far as part of the figures show units to perform certain programmable functions, these units must be considered as subparts of the computer program. Particularly, the look-up tables can be realized by part of the computer's memory.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A video apparatus having histogram modification means for matching at least luminance signals for separate pixels to prescribed values, the histogram modification means comprising:

a first channel having a first memory containing a first look-up table for correcting said luminance signals; and at least one second channel having a second memory containing a second look-up table for correcting color-difference signals corresponding to said luminance signals, wherein values stored in said second look-up table are derived from the values stored in the first look-up table, characterized in that the first look-up table contains corrected luminance values in accordance with a predetermined correction function, and the second look-up table contains gain-values, derivable from said predetermined correction function, and the histogram modification means further comprises a multiplier for multiplying the color-difference signals by respective gain-values as supplied by the second look-up table.

2. The video apparatus as claimed in claim 1, characterized in that the histogram modification means further comprises:

a sample rate converter for adapting a sample rate of the luminance signals to a sample rate of the color-difference signals, output signals of said sample rate converter being supplied to the second memory.

3. The video apparatus as claimed in claim 1, characterized in that the histogram modification means further comprises means for decreasing each of the color-difference signals by an offset value before multiplication, and means for increasing said color-difference signals, after said multiplication, by said offset value.

4. A video apparatus having histogram modification means for matching at least luminance signals for separate pixels to prescribed values, the histogram modification means comprising:

a first channel having a first memory containing a first look-up table for correcting said luminance signals; and at least one second channel having a second memory containing a second look-up table for correcting color-difference signals corresponding to said luminance signals, wherein values stored in said second look-up table are derived from the values stored in the first look-up table, characterized in that, in order to obtain a distribution of a rounding-off error over a pixel's neighbor, said first and said at least one second channels for the luminance and color-difference signals comprises a closed correction loop having a quantizer and a pixel memory, the input of the correction loop being formed by the corrected luminance and corrected color-difference signals, respectively.

5. A video apparatus having histogram modification means for matching at least luminance signals for separate pixels to prescribed values, the histogram modification means comprising:

a first channel having a first memory containing a first look-up table for correcting said luminance signals; and at least one second channel having a second memory containing a second look-up table for correcting color-difference signals corresponding to said luminance signals, wherein values stored in said second look-up table are derived from the values stored in the first look-up table, characterized in that said histogram modification unit means provides a correction function calculated on the basis of black, gray and white brightness levels in the measured histogram, with only three control operators, offset, gain and gamma, according to the relation:

$$V_o = [(V_i + \text{offset}) * \text{gain}]^{Gamma},$$

where $V_o$ is the input luminance or color-difference signal, and $V_i$ is the output luminance or color-difference signal.

* * * * *